(12) United States Patent
Nakajima

(10) Patent No.: US 8,014,016 B2
(45) Date of Patent: Sep. 6, 2011

(54) RETRIEVING SYSTEM AND RETRIEVING METHOD

(75) Inventor: Satoru Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 922 days.

(21) Appl. No.: 11/947,689

(22) Filed: Nov. 29, 2007

(65) Prior Publication Data

US 2008/0144110 A1 Jun. 19, 2008

(30) Foreign Application Priority Data

Dec. 14, 2006 (JP) ................................. 2006-337578

(51) Int. Cl.
*G06K 15/00* (2006.01)
*G06F 15/00* (2006.01)
*H04N 1/40* (2006.01)
(52) U.S. Cl. ................. 358/1.15; 358/1.9; 358/3.28
(58) Field of Classification Search ................. 358/1.6, 358/474, 401, 439, 443, 434, 435, 436, 1.15
See application file for complete search history.

(56) References Cited

U.S. PATENT DOCUMENTS

| 5,109,434 | A  | * | 4/1992 | Shimizu et al. | 382/276 |
| 5,745,664 | A  | * | 4/1998 | Nomura et al. | 358/1.18 |
| 6,704,467 | B2 | * | 3/2004 | Uchida | 382/311 |
| 2007/0024920 | A1 | * | 2/2007 | Kishi et al. | 358/448 |
| 2007/0097425 | A1 | * | 5/2007 | Kajita et al. | 358/1.15 |

FOREIGN PATENT DOCUMENTS

JP  2002-318812 A  10/2002

\* cited by examiner

*Primary Examiner* — Jerome Grant, II
(74) *Attorney, Agent, or Firm* — Canon USA, Inc. IP Division

(57) ABSTRACT

A retrieving system includes a requesting device and a plurality of storage devices. The requesting device includes an input unit configured to input image data, an extracting unit configured to extract a retrieval key from the image data input by the input unit, a selecting unit configured to select at least one retrieval device from the storage devices according to a characteristic of the image data input by the input unit, and a requesting unit configured to request the retrieval device selected by the selecting unit to perform a retrieval based on the retrieval key extracted by the extracting unit.

10 Claims, 8 Drawing Sheets

RETRIEVING SYSTEM AND RETRIEVING METHOD

BACKGROUND OF THE INVENTION

1. Field of the Invention

The present invention relates to a retrieving system and a retrieving method, and particularly relates to a system and a method for retrieving data stored in devices (e.g., multifunction peripherals) connected by a network.

2. Description of the Related Art

In recent years, in addition to a copying function capable of being performed by a digital copying machine, digital multifunction peripherals capable of performing a number of other functions have become increasingly popular due to their practical uses. A digital multifunction peripheral may include, as the additional functions, for example, a facsimile communication function which utilizes a scanner and a printer that are primarily provided in the digital copying machine. Further, by using a printer function, a code data sent from a computer can be rasterized into a bitmap data to output a print product. Alternatively, by using a scanner function, an image data read by the scanner can be sent to a network. Further, by using a printer function, the image data sent from the network can be printed out.

As one of the functions added to such a digital multifunction peripheral, a personal box function is known. According to the personal box function, a region is allocated to each individual user or department inside a storage unit of the digital multifunction peripheral. Print image data and scan image data input from the scanner are stored in the region, and can be output as necessary.

Further, circumstances exist in which it is desirable to enable the image data stored in the storage unit by the personal box function to be viewed on the network, and the image data stored in the storage unit of each digital multifunction peripheral to be shared and jointly used. According to a method, by inputting instructions via an operation screen of a certain digital multifunction peripheral, the data stored in other digital multifunction peripherals existing on the network can be retrieved, and desired data can be viewed and printed out in the digital multifunction peripheral operated by the user.

Conventionally, as a retrieving method, an attribute retrieval using attributes (file name, index, etc.) associated with the stored data, and a text retrieval based on text information extracted from the stored data have been known. Further, a similar image retrieval is known (Japanese Patent Application Laid-Open No. 2002-318812) in which an image data acquired by reading an original by the scanner, or an image data acquired by dividing the image data into a plurality of regions is taken as a retrieval key, and a file including a similar image is retrieved using the retrieval key.

However, in a network system in which a plurality of digital multifunction peripherals are connected, when a document existing on a digital multifunction peripheral is retrieved from another digital multifunction peripheral, all digital multifunction peripherals on the network may become the retrieval targets. Consequently, when the retrieval is performed in such a network system, it may be necessary to make an inquiry to all digital multifunction peripherals and receive responses from them. Accordingly, the retrieval process may also be executed in a digital multifunction peripheral in which a retrieval target possibly does not exist, and therefore, a retrieval processing time increases, and the loads of unrelated digital multifunction peripherals and/or the load of the network traffic are increased.

SUMMARY OF THE INVENTION

An embodiment of the present invention is directed to a retrieving system and a retrieving method capable of improving retrieval efficiency.

Another feature of the present invention is to specify a device serving as a retrieval target based on characteristics of image serving as a retrieval key.

According to an aspect of the present invention, an embodiment is directed a retrieving system including a requesting device (e.g., multifunction peripheral) and a number of storage devices (e.g., multifunction peripherals). The requesting device includes an input unit configured to input image data, an extracting unit configured to extract a retrieval key from the image data input by the input unit, a selecting unit configured to select at least one retrieval device from the storage devices according to a characteristic of the image data input by the input unit, and a requesting unit configured to request the retrieval device selected by the selecting unit to perform a retrieval based on the retrieval key extracted by the extracting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
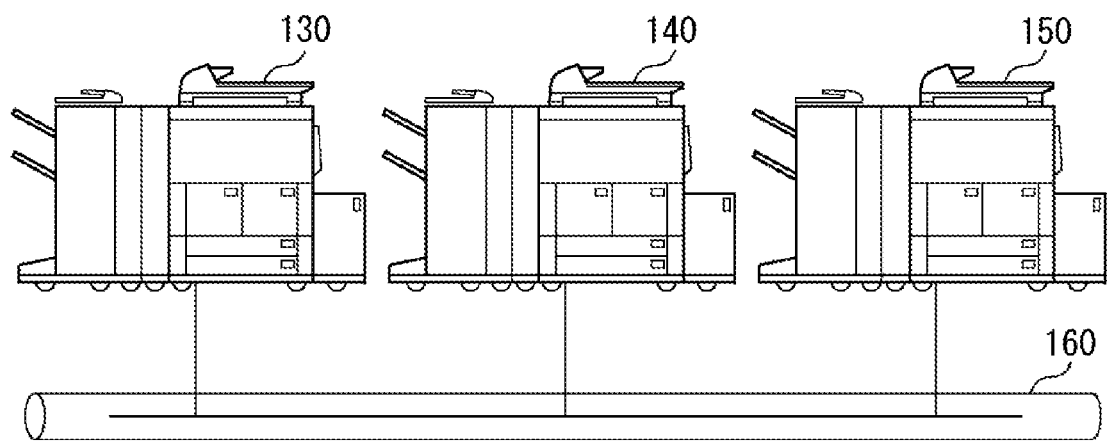
FIG. 1 is a view illustrating a configuration of an image retrieving system according to an embodiment of the present invention.

FIG. 1 is a view illustrating a configuration of an image retrieving system according to an embodiment of the present invention. The image retrieving system is configured such that a plurality of digital multifunction peripherals 130, 140, 150, and the like are mutually connected by a local area network (LAN) 160. Other devices (other than digital multifunction peripherals) can be also connected to the LAN 160.

Figure 2:
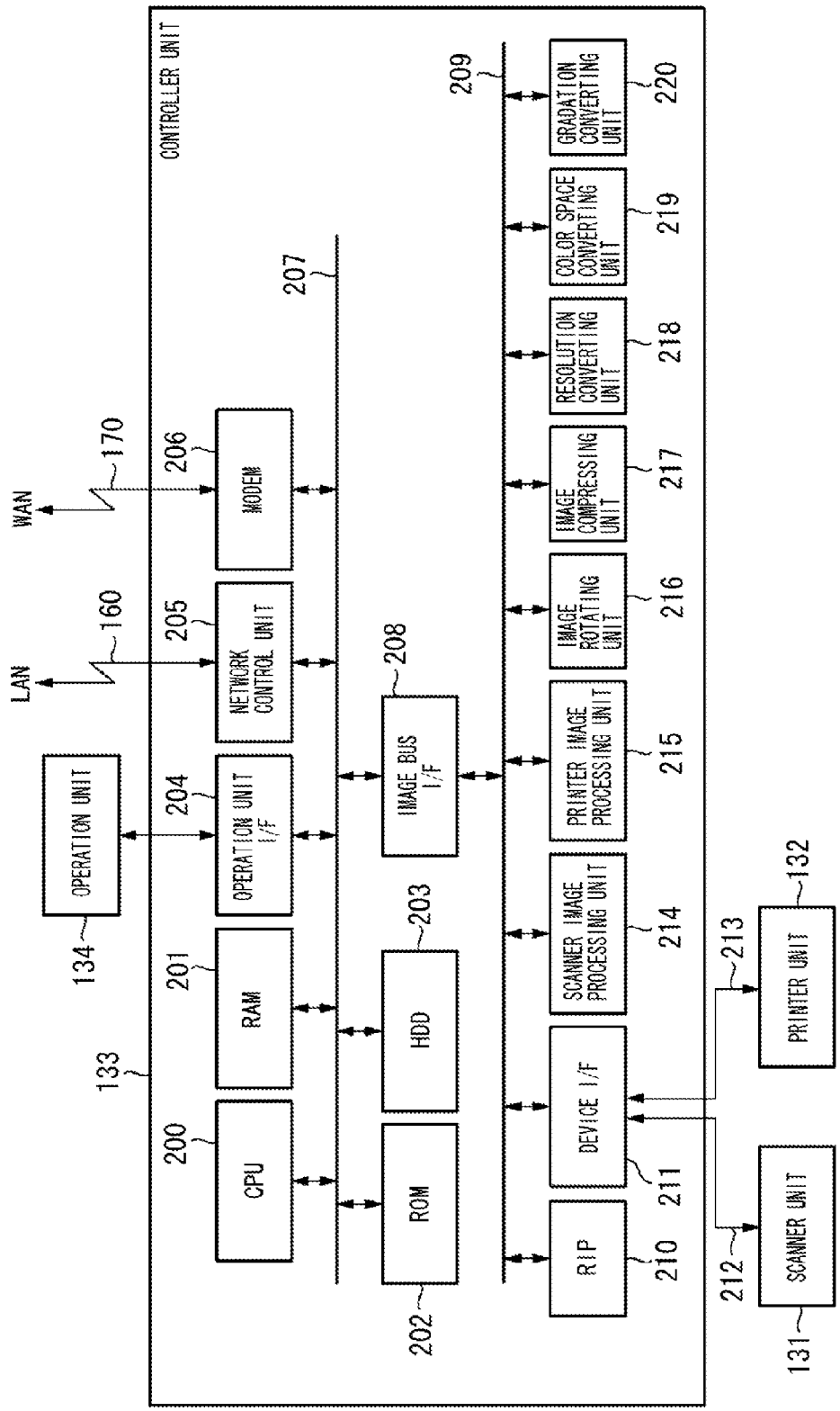
FIG. 2 is a block diagram illustrating an internal configuration of a digital multifunction peripheral according to an embodiment of the present invention.

FIG. 2 is a block diagram illustrating an internal configuration of the digital multifunction peripheral 130 illustrated in FIG. 1. Other digital multifunction peripherals 140 and 150 are also configured to be approximately similar to the digital multifunction peripheral 130. Referring to FIG. 2, the digital multifunction peripheral 130 is integrated into a single apparatus as illustrated in FIG. 1, and includes a scanner unit 131 (i.e., an image input device), a printer unit 132 (i.e., an image output device), a controller unit 133, and an operation unit 134. However, the digital multifunction peripheral of the present embodiment is not limited to such a configuration.

The controller unit 133 is connected to the scanner unit 131 and the printer unit 132. On the other hand, the controller unit 133 is connected to the LAN 160 and a wide area network (WAN) 170 (i.e., public line) through which input/output of image information and device information are performed and controlled.

In the controller unit 133, a central processing unit (CPU) 200 controls various components of the multifunction peripheral 130. A random access memory (RAM) 201 is a system work memory to operate the CPU 200, and also serves as an image memory (buffer memory) to temporarily store input image data. A boot ROM 202 stores a boot program of the multifunction peripheral 130. A hard disc drive (HDD) 203 stores system software, image data, and the like.

An operation unit interface (I/F) 204 outputs image data to be displayed on the operation unit 134 and information about the image data to the operation unit 134, serving as an interface with the operation unit 134. The operation unit I/F 204 transmits the information (e.g., instructions) input by an operator via the operation unit 134, to the CPU 200. A network control unit 205 is connected to the LAN 160 to input/output data (e.g., user instruction information). A modem (MODEM) 206 is connected to the WAN 170 to input/output data (e.g., image information).

An image bus I/F 208 serves as a bus bridge to connect a system bus 207 with an image bus 209 that transfers the image data at a high speed and to convert a data structure. The image bus 209 includes a peripheral component interconnect (PCI) bus or IEEE1394.

A device connected to the image bus 209 will be described below. A raster image processor (RIP) 210 rasterizes a PDL code into a bitmap image. A device I/F 211 connects the scanner unit 131 and the printer unit 132, which are image input/output devices, to the controller unit 133 through an image input unit interface 212 and a printer unit interface 213, and performs the synchronous/non-synchronous conversion of the image data. A scanner image processing unit 214 applies a process such as correction, editing, and the like to the input image data. The scanner processing portion 214 has a function of determining whether the input image is color or black-and-white, by a chroma signal of the image, and holds a determination result. A printer image processing unit 215 applies a process such as correction, editing, and the like to the output image data.

An image rotating unit 216 that rotates the image data performs a following rotating process. For example, in cooperation with the scanner image processing unit 214, the image rotating unit 216 can simultaneously read and rotate the image from the scanner unit 131, and store the image on the memory such as the RAM 201, the HDD 203, and the like. Further, the image rotating unit 216 can rotate the image and store the obtained image in the memory again. The image rotating unit 216 can also print and output the image on the memory, while rotating in coordination with the printer image processing unit 215. An image compressing unit 217 performs a compression expansion process on a multiple image data by JPEG, and on a binary image data by JBIG, MMR, MR, and MH. A resolution converting unit 218 converts resolution of the image on the memory and stores the converted image again. A color space converting unit 219 converts, for example, a YUV image on the memory into a Lab image by a matrix calculation and stores the converted image again. A gradation converting unit 220, for example, converts an image of 8 bits with 256 gradations into an image of 1 bit with 2 gradations by the technique such as an error diffusion process and stores the converted image again.

The image rotating unit 216, the image compressing unit 217, the resolution converting unit 218, a color space converting portion 219, and the gradation converting portion 220 can operate in conjunction with one another. For example, when the image on the memory is rotated and resolution is converted, after the image read once from the memory is rotated, resolution is converted without being stored again into the memory. Thus, both the image rotation and the resolution conversion can be performed without going by the medium of the memory.

Figure 3:
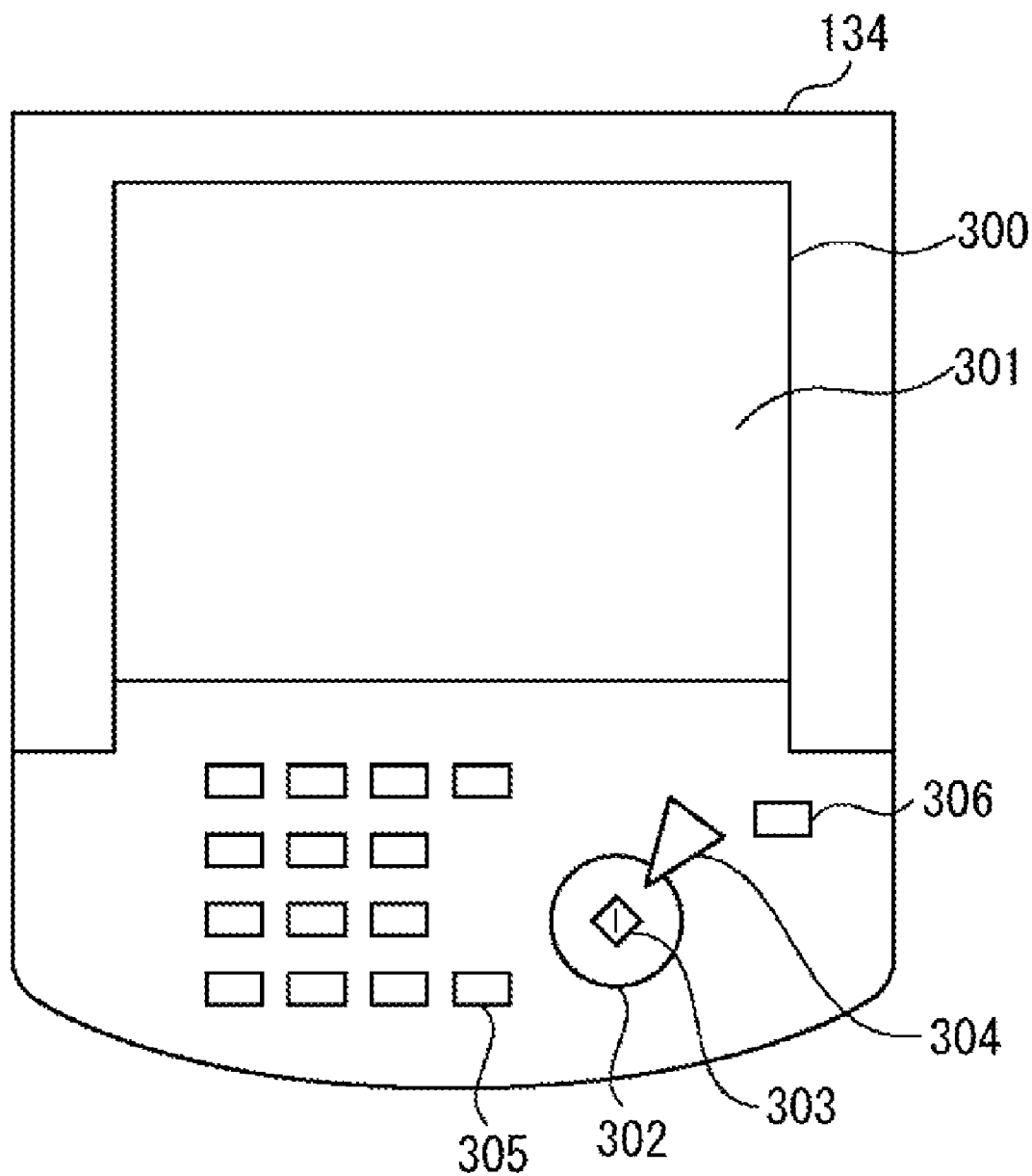
FIG. 3 illustrates an external view of an operation unit of a digital multifunction peripheral according to an embodiment of the present invention.

FIG. 3 illustrates an external appearance of the operation unit 134. In FIG. 3, an LCD display unit 300 has a touch panel sheet 301 attached to an LCD, and displays an operating screen of the system and soft keys. When one of the soft keys is pressed down, positional information of the pressed key is transmitted to the CPU 200 inside the controller unit 133. A start key 302 is used when a reading operation of an original image is started. An LED 303 of two colors of green and red provided at the center of the start key 302 indicates whether the start key is in a usable state with a lightening color of the LED. A stop key 304 is used when a current operation is stopped. An ID key 305 is used when a user ID of the user is input. A reset key 306 is used when the setting by the operation unit 134 is initialized.

Figure 4:
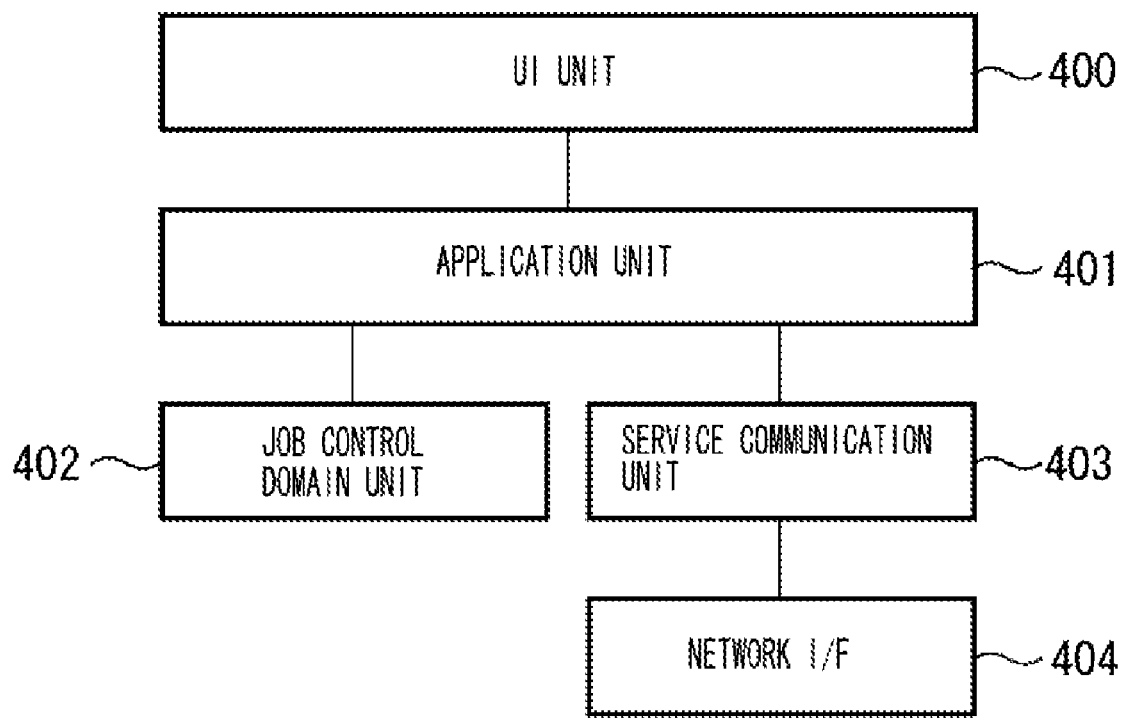
FIG. 4 is a block diagram illustrating a functional configuration of system software in a digital multifunction peripheral according to an embodiment of the present invention.

FIG. 4 is a block diagram illustrating a functional configuration of the system software in the controller unit 133 of the digital multifunction peripheral 130 illustrated in FIG. 1. A user interface (UI) unit 400 provides the input information sent from the operator, to an application unit 401 and receives a process result from the application unit 401, and generates a display screen of the operation unit 134. The application unit 401 performs the process according to the request from the UI unit 400. For example, when scanning or printing is requested, the application unit 401 starts a job with the setting specified by a job control domain unit 402 and receives the information about a state of the device and the job from the job control domain unit 402. Further, when retrieval is requested, the application unit 401 provides the information that allows the operator to specify the retrieval condition, to the UI unit 400, and sends the retrieval request with the specified retrieval condition to a service communication unit 403 and receives a process result.

The job control domain unit 402 manages a plurality of jobs such as a scan job, a copy job, a print job, and a FAX job. The service communication unit 403 sends a request command to other digital multifunction peripherals by a SOAP protocol on a HTTP protocol through a network I/F 404, and receives responses. The network I/F 404 is connected to the LAN 160, and performs the process of the network protocol such as TCP/IP and the like.

The similar image retrieval process according to an embodiment of the present invention will be described below in detail. In the image retrieving system including the configuration illustrated in FIG. 1, an example of performing the similar image retrieval process by an instruction from the digital multifunction peripheral 130 (the device requesting for retrieval) will be described.

Figure 5:
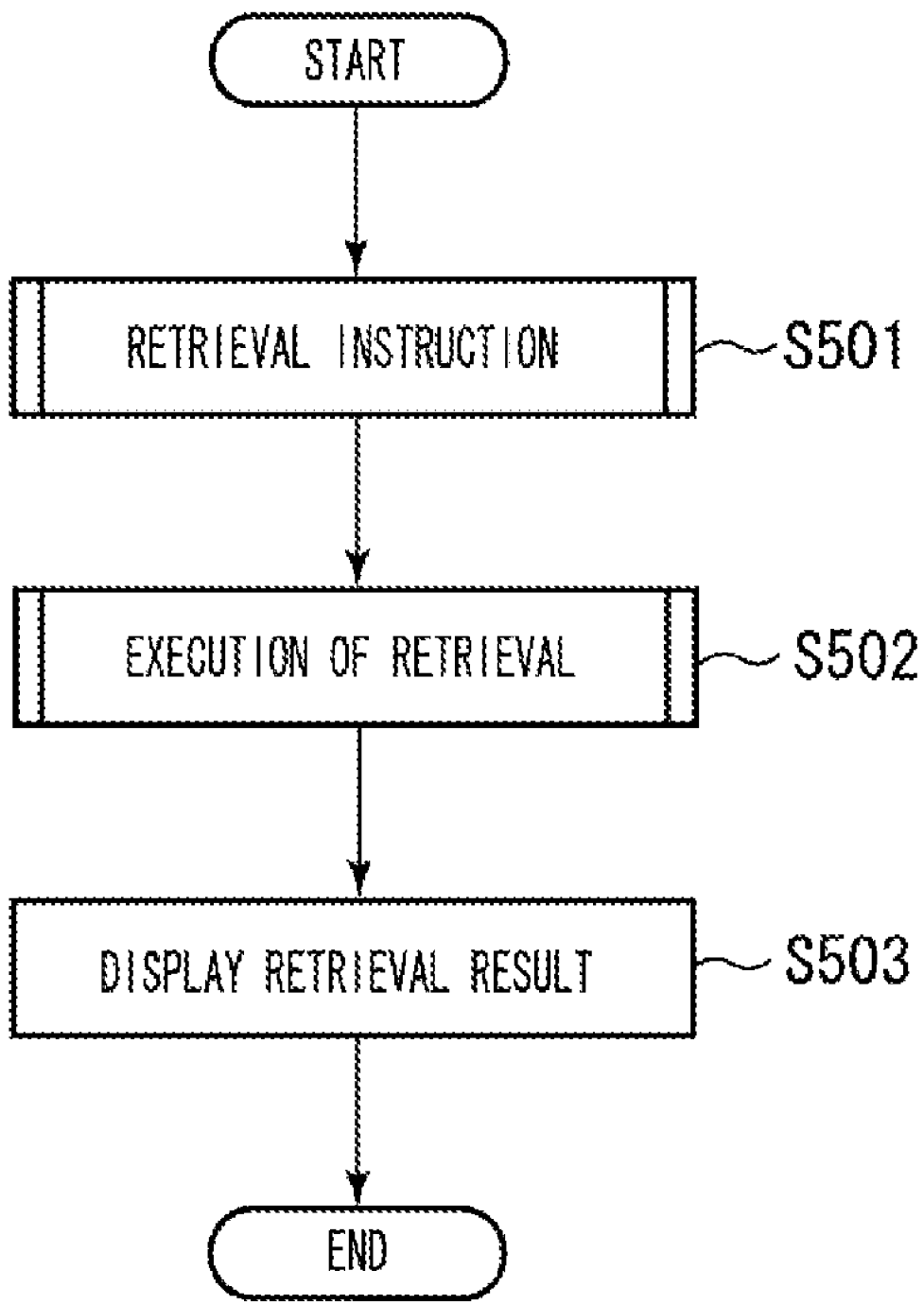
FIG. 5 is a flowchart illustrating an outline of a similar image retrieval process according to an embodiment of the present invention.

FIG. 5 is a flowchart illustrating the outline of the similar image retrieval process. First, the operator operates the operation unit 134 to start the similar image retrieval process of the present embodiment. In step S501, the digital multifunction peripheral 130 displays a screen to prompt the operator to execute a retrieval instruction. In step S502, when the operator performs the desired setting according to the prompt of the screen and instructs an execution of the retrieval process, the similar image retrieval process is executed. In step S503, the digital multifunction peripheral 130 displays a retrieval result on the operation unit 134, and terminates the process.

Figure 6:
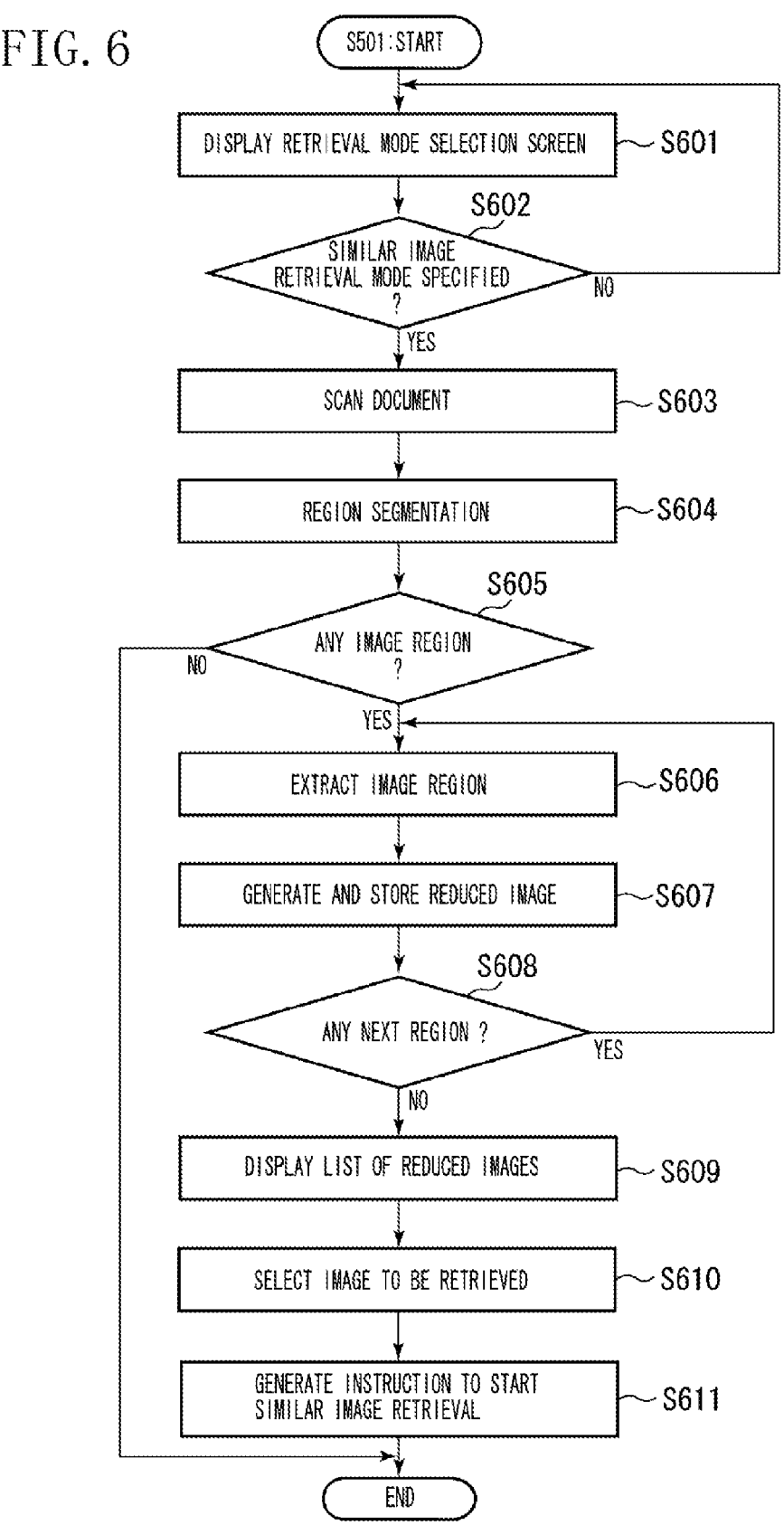
FIG. 6 is a flowchart illustrating an outline of a similar image retrieval instruction process according to an embodiment of the present invention.

The retrieval instruction processing of the similar image in step S501 of FIG. 5 will be described below in detail. FIG. 6 is a flowchart illustrating the details of the similar image retrieval instruction process in step S501. In step S601, when the retrieval instruction is issued, the digital multifunction peripheral 130 displays a retrieval mode selection screen on the operation unit 134. If the similar image retrieval is selected as a retrieval mode on the screen in step S602 (YES in step S602), the process proceeds to a mode that prompts a scan of the original. In step S603, when the original from which an image key is to be extracted, is set to the scanner unit 131 by the operator and a scan execution is instructed, the controller unit 133 actuates the scanner unit 131 and executes a process to read the original. At this time, the read image data is temporarily stored in the HDD 203.

Next, in step S604, a region segmentation process is performed for the stored image data. This process is executed by a region segmentation engine of the application unit 401. In step S605, the digital multifunction peripheral 130 determines whether an image region exists based on a result of the region segmentation process. If the image region does not exist (NO in step S605), the digital multifunction peripheral 130 sets the predetermined error flag indicating no image region, and displays an error message as necessary, and then, terminates the process. When this error flag is on, the subsequent process from step S502 is skipped.

On the other hand, if the image region exists (YES in step S605), the digital multifunction peripheral 130 extracts a corresponding region from the image data stored in the HDD 203 in step S606. In step S607, the digital multifunction peripheral 130 generates a reduced image for the screen display, and stores it in the HDD 203. Next, in step S608, the digital multifunction peripheral 130 determines whether an unprocessed segmented region exists. If it is determined that an unprocessed segmented region exists (YES in step S608), the process returns to step S606, and the digital multifunction peripheral 130 repeats the extraction of the region and the storing of the reduced image. On the other hand, if it is determined that an unprocessed segmented region does not exist (NO in step S608), the digital multifunction peripheral 130 displays list of the reduced images stored in the HDD 203 on the operation unit 134 in step S609. In step S610, the operator, referring to the displayed reduced images, selects a retrieval target, that is, a retrieval key image in the similar image retrieval. In step S611, the operator instructs start of the similar image retrieval, and the process is terminated.

Figure 7:
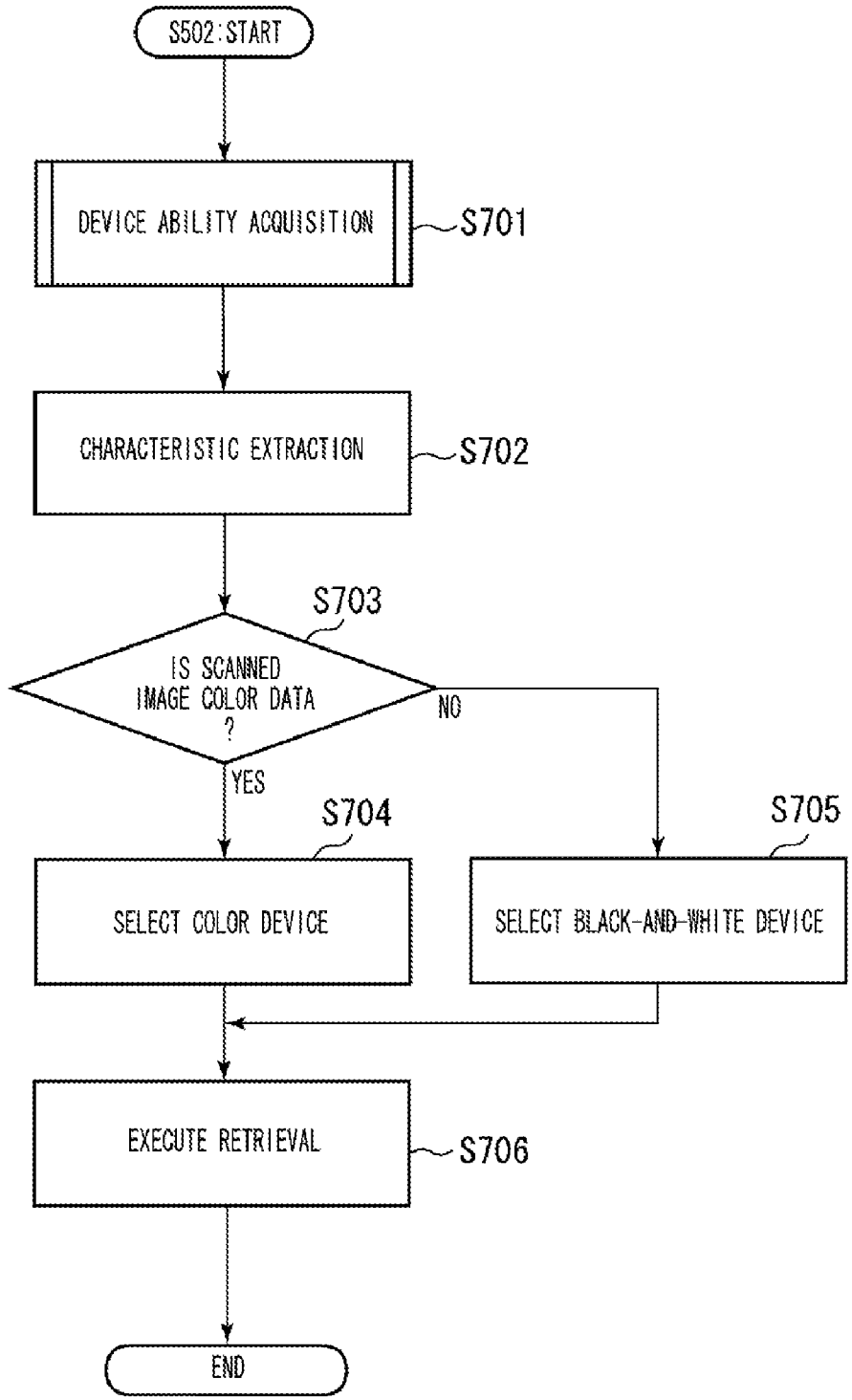
FIG. 7 is a flowchart illustrating a retrieval device determining process according to an embodiment of the present invention.

The retrieval execution process in step S502 of FIG. 5 will be described below in detail. FIG. 7 is a flowchart illustrating the details of the retrieval execution process in step S502. As the feature of the retrieval execution process, after the device which becomes a retrieval target is appropriately determined from among the digital multifunction peripherals in the system, the retrieval of the similar image is performed. A request for retrieval is sent to the device determined as a retrieval target, and the device that has received the request executes the similar image retrieval.

In the present embodiment, from among the plurality of digital multifunction peripherals 130, 140, and 150 on the LAN 160, an instruction is issued to the digital multifunction peripheral 130 to perform the similar image retrieval. First, in step S701, the digital multifunction peripheral 130 acquires ability information from each of other digital multifunction peripherals 140 and 150 existing on the LAN 160. By this process, for example, it can be determined whether the scanner units of the digital multifunction peripherals 140 and 150 existing on the LAN 160 are color scanners or black-and-white scanners. The details of this device ability acquisition process will be described below.

In step S702, the digital multifunction peripheral 130 analyzes the image that is scanned in step S603 in response to the retrieval instruction, and extracts the characteristic of the image. In step S703, for example, when color information is analyzed, the digital multifunction peripheral 130 determines whether the scanned image is color data or black-and-white data according to the analysis result. As a result, if it is determined that the scanned image is color data (YES in step S703), the digital multifunction peripheral 130 selects only a digital multifunction peripheral which is mounted with a color scanner, as a retrieval target device in step S704. On the other hand, if it is determined that the scanned image is black-and-white data (NO in step S703), the digital multifunction peripheral 130 selects only a digital multifunction peripheral which is mounted with a black-and-white scanner, as a retrieval target device in step S705. In step S706, the digital multifunction peripheral 130 executes the similar image retrieval on the selected digital multifunction peripheral, and terminates the process. In steps S704 and S705, the digital multifunction peripheral is selected according to its scanner function (color/black-and-white). It is noted that this scanner function is detected based on the predetermined color flag. A method for selecting the color flag will be described below.

Figure 8:
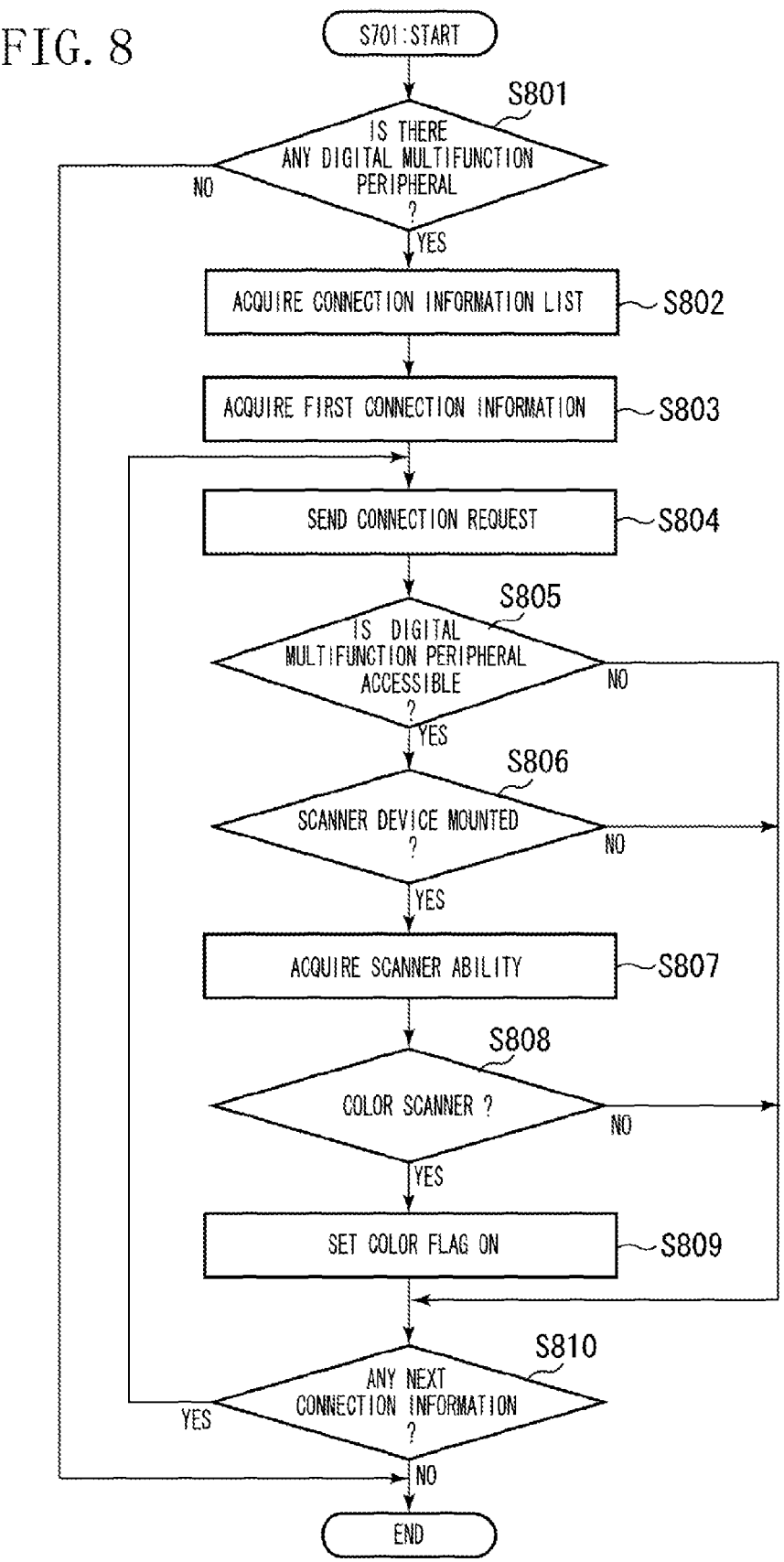
FIG. 8 is a flowchart illustrating a device ability acquisition process according to an embodiment of the present invention.

FIG. 8 is a flowchart illustrating the details of the device ability acquisition process in step S701.

When the acquisition process of the device ability is started, the digital multifunction peripheral 130 determines whether a digital multifunction peripheral exists on the LAN 160 in step S801. More specifically, through the network control unit 205, the digital multifunction peripheral 130 inquires of other devices on the LAN 160 as to whether they are digital multifunction peripherals. Here, the other devices are inquired whether they are digital multifunction peripherals according to the predetermined information, however, the details thereof are omitted here.

When the digital multifunction peripherals 140 and 150 on the LAN 160 receive the above described inquiry, the digital multifunction peripherals 140 and 150 returns connection information indicating that the digital multifunction peripherals are connected, via the LAN 160. The digital multifunction peripheral 130 receives response concerning the connection information at the service communication unit 403. If the response does not arrive within the predetermined time, the digital multifunction peripheral 130 determines that no digital multifunction peripherals exist on the LAN 160 (NO in step S801). In that case, the digital multifunction peripheral 130 displays an error message indicating that no digital multifunction peripherals exist on the LAN 160 on the operation unit 134, and terminates the similar image retrieval process.

On the other hand, when the digital multifunction peripheral 130 has received the responses notifying connection information and determines that other digital multifunction peripherals exist on the LAN 160 (YES in step S801), the digital multifunction peripheral 130 lists and stores the connection information from each of other digital multifunction peripherals in step S802. The connection information includes, for example, an IP address, specific ID information, and the like which enable connection to those digital multifunction peripherals.

Next, in step S803, the digital multifunction peripheral 130 acquires first connection information from the list of the stored connection information. In step S804, the digital multifunction peripheral 130 sends a connection request together with user information to a digital multifunction peripheral having the first connection information (e.g., the digital multifunction peripheral 140).

The digital multifunction peripheral 140 having received the connection request authenticates a user based on the received user information and returns access permission information. In step S805, when the service communication unit 403 receives the access permission information, the digital multifunction peripheral 130 determines whether the digital multifunction peripheral 140 is accessible. If the access is not permitted (NO in step S805), the process proceeds to step S810. If the access is permitted (YES in step S805), the digital multifunction peripheral 130 sends an acquisition request for information about mounting of the scanner device, to the digital multifunction peripheral 140 and determines whether the scanner device is mounted on the digital multifunction peripheral 140 in step S806.

If the digital multifunction peripheral 140 is not mounted with the scanner device (NO in step S806), the process proceeds to step S810. If the scanner device is mounted (YES in step S806), the digital multifunction peripheral 130 acquires ability information about the scanner mounted on the digital multifunction peripheral 140 in step S807. In step S808, the digital multifunction peripheral 130 determines whether the scanner of the digital multifunction peripheral 140 is color or black-and-white. If it is not a color scanner, that is, a black-and-white scanner (NO in step S808), the process proceeds to step S810. If it is a color scanner (YES in step S808), the digital multifunction peripheral 130 sets a color scanner flag in step S809 and proceeds to step S810. The color flag is prepared in the digital multifunction peripheral 130 for each of the other multifunction peripherals connected on the LAN 160, and the initial value of the flag is set to off.

In step S810, if the next connection information (e.g., the connection information about the digital multifunction peripheral 150) is present (YES in step S810), the process proceeds to step S804. On the other hand, if unprocessed connection information is not present (NO in step S810), the device ability acquisition process is terminated. By the above described process, the color flag for each of the other digital multifunction peripherals held by the digital multifunction peripheral 130 is all appropriately set according to the ability of scanner mounted in each multifunction peripheral. Consequently, in steps S704 and S705 illustrated in FIG. 7, the scanner function by the color flag can be determined.

As described above, according to the present embodiment, when the similar image retrieval is performed, the retrieval target device is selected according to the feature of the devices connected on the network. That is, the device showing high probability of storing the image similar to the retrieval key image is preferentially taken as a retrieval target, so that the retrieval time can be shortened and the network traffic can be improved so that more efficient retrieval can be performed.

Further, an inconvenience case can be prevented where the device that does not store the document of the retrieval target, performs a useless process.

In the present embodiment, when the input image for extracting the retrieval key is color, the retrieval is executed only for the digital multifunction peripheral provided with the color scanner. However, the present invention is not limited to this exemplary embodiment. It is useful if, according to the scanner function in the digital multifunction peripheral, the retrieval target device can be determined. Accordingly, when the input image is a color image, the digital multifunction peripheral provided with the color scanner is preferentially retrieved, and after that, the digital multifunction peripheral provided with the black-and-white scanner is retrieved.

Further, in the present embodiment, a color processing (scanner) function in the digital multifunction peripheral is determined according to the color characteristics of the image that provides the retrieval key. However, the present invention is not limited to this exemplary embodiment. That is, it is useful that the characteristics of the image that provides the retrieval key is determined, and the device that has high probability of containing the image according to these characteristics can be selected as a retrieval target. For example, the retrieval target device can be selected according to a size of the original. More specifically, when the original has an A3 size, a device corresponding to A3 can be selected as a retrieval target. Further, for example, when the original image data contains a model code, a device corresponding to this code is taken as a retrieval target. Likewise, when the data contains an area code, a device installed in the area can be taken as a retrieval target. Further, likewise, when the original image data contains a user code, a device which a user is permitted to use can be taken as a retrieval target. Further, the device of the retrieval target can store a list of the information about the characteristics of the stored image data, and based on the list, the first retrieval target device can be selected. In that case, in place of the acquisition of the device ability in FIG. 7, the characteristic information about the stored image is acquired, and a retrieval request can be made to the device which stores the characteristics information corresponding to the image to be retrieved.

According to an embodiment, when the document stored in the devices connected through the network is retrieved, based on the characteristics of the image which is the retrieval key, the device that has high probability of storing the relative document is taken as a retrieval target, so that an efficient retrieval process can be achieved.

While an embodiment of the invention is described in detail as above, the present invention can be, for example, a system, a device, a method, a program or a storage medium (recording medium). More specifically, the invention can be applied to a system including a plurality of devices (a host computer, an interface device, a printing device, a web application, etc.) or can be applied to an apparatus including a single device.

The present invention can be achieved by providing a software program for realizing the function of the above described embodiment to a system or a device directly or remotely, and by reading and executing the provided program with a computer of the system or the device. The program in this case is a program corresponding to the flowchart shown in the figures in the embodiment.

Consequently, the program code itself installed in a computer to realize the function process of the present invention in the computer, also realizes the present invention. That is, the present invention includes the computer program itself that realizes the function process of the present invention.

In that case, the program can be in a form of an object code, a program executed by an interpreter, and a script data supplied to an OS and the like.

As the recording medium for supplying such program, a Floppy® disc, a hard disc, an optical disc, a magneto-optic disc, MO, a compact disc-read only memory (CD-ROM), a compact disc-recordable (CD-R), a CD-rewritable (CD-RW), a magnetic tape, a non-volatile memory card, a read only memory (ROM), a digital versatile disc (DVD (DVD read only memory (DVD-ROM) and DVD rewritable (DVD-R)), for example, can be used.

A method for providing the program can also be realized by the following method. The method includes accessing the Internet web page through a browser of the client computer, and downloading the computer program itself (or a file including a compressed automatic installation function) of the present invention from the web page into the recording medium such as the hard disc. Further, the method can be also realized by dividing the program code constituting the present invention into a plurality of files and downloading each file from different web pages. That is, a WWW server that allows a plurality of users to download the program file for realizing the function process of the present invention in the computer is also included in the present invention.

Further, the program of the present invention can be encrypted to be stored into a storage medium such as CD-ROM for the distribution to the user, and key information for decrypting can be downloaded from the web page through the internet by the user having satisfied the predetermined condition. That is, the user can execute the encrypted program by using the key information and installing the program into the computer.

Further, based on instructions of the program, the OS and the like working on the computer can perform a part or the whole of the actual process so that the function of the embodiment can also be realized.

Further, the program read from the recording medium can be written into a function expansion board inserted into the computer and a memory provided for a function expansion unit connected to the computer, and the program is executed so that the function of the embodiment can also be realized. That is, based on instructions of the program, a CPU and the like provided in the function expansion board or the function expansion unit can perform a part or the whole of the actual process.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-337578 filed Dec. 14, 2006, which is hereby incorporated by reference herein in its entirety.

What is claimed is:

1. An apparatus configured to communicate with a plurality of storage devices, wherein each storage device stores a plurality of image data, the apparatus comprising:
    an input unit configured to input image data;
    an extracting unit configured to extract a retrieval key from the image data input by the input unit;
    a selecting unit configured to select a storage device from the plurality of storage devices according to a characteristic of the image data input by the input unit; and
    a requesting unit configured to request the storage device selected by the selecting unit to retrieve, from the plurality of image data stored in the storage device selected by the selecting unit, image data corresponding to the retrieval key extracted by the extracting unit.

2. The apparatus according to claim 1, further comprising an acquiring unit configured to acquire ability information indicating an ability of each storage device, wherein the selecting unit selects the storage device according to the ability information acquired by the acquiring unit.

3. The apparatus according to claim 2, wherein the ability information includes an ability concerning an image input.

4. The apparatus according to claim 1, wherein the characteristic includes color information of the image data.

5. The apparatus according to claim 1, wherein the extracting unit divides the image data into a plurality of regions and selects one region from the plurality of regions as the retrieval key.

6. The apparatus according to claim 2, wherein the plurality of storage devices comprise a plurality of multifunction peripherals.

7. The apparatus according to claim 6, wherein the ability information includes information indicating whether a respective multifunction peripheral has a color scanner or a black-and-white scanner.

8. A method to communicate with a plurality of storage devices, wherein each storage device stores a plurality of image data, the method comprising:
    inputting image data;
    extracting a retrieval key from the input image data;
    selecting a storage device from the plurality of storage devices according to a characteristic of the input image data; and
    requesting the selected storage device to retrieve, from the plurality of image data stored in the selected storage device, image data corresponding to the extracted retrieval key.

9. A non-transitory computer-executable program stored in a computer-readable storage medium, including instructions which, when executed by an apparatus, causes the apparatus to perform operations comprising:
    inputting image data;
    extracting a retrieval key from the input image data;
    selecting a storage device from the plurality of storage devices according to a characteristic of the input image data; and
    requesting the selected storage device to retrieve, from the plurality of image data stored in the selected storage device, image data corresponding to the extracted retrieval key.

10. The apparatus according to claim 1, wherein the plurality of storage devices is located outside the apparatus.

* * * * *